(12) United States Patent
Reichling et al.

(10) Patent No.: US 7,400,232 B2
(45) Date of Patent: Jul. 15, 2008

(54) ILLUMINATED VEHICLE GRAB HANDLE WITH KEYPAD FOR KEYLESS ENTRY

(75) Inventors: Anita L. Reichling, New Hampton, IA (US); Dave Magner, Calmar, IA (US); Daniel J. De Boer, Lawler, IA (US)

(73) Assignee: TriMark Corporation, New Hampton, IA (US)

( * ) Notice: Subject to any disclaimer, the term of this patent is extended or adjusted under 35 U.S.C. 154(b) by 90 days.

(21) Appl. No.: 11/382,790

(22) Filed: May 11, 2006

(65) Prior Publication Data

US 2008/0018437 A1    Jan. 24, 2008

(51) Int. Cl.
*B60R 25/10*    (2006.01)

(52) U.S. Cl. .............................. 340/426.36; 340/426.28; 340/426.1; 340/425.5; 362/399; 362/501; 16/444; 16/110.1

(58) Field of Classification Search .............. 340/425.5, 340/434, 426.28, 426.35, 426.36, 426.1; 362/501, 394, 85, 511, 543, 540, 399; 16/444, 16/110.1, 903, DIG. 24; 307/10.2, 10.3, 307/10.4; 180/287, 281
See application file for complete search history.

(56) References Cited

U.S. PATENT DOCUMENTS

| | | | |
|---|---|---|---|
| 5,025,352 | A | 6/1991 | Brown |
| 5,297,010 | A | 3/1994 | Camarota et al. |
| 5,779,228 | A | 7/1998 | Hansen |
| 6,065,852 | A | 5/2000 | Crumley |
| 6,135,621 | A | 10/2000 | Bach et al. |
| 6,164,805 | A | 12/2000 | Hulse |
| 6,185,294 | B1 * | 2/2001 | Chornenky et al. ......... 379/350 |
| 6,378,344 | B1 * | 4/2002 | Gartner ..................... 70/278.1 |
| 6,415,732 | B1 | 7/2002 | Delorenzo |
| 6,523,888 | B1 | 2/2003 | Yan et al. |
| 6,553,629 | B2 * | 4/2003 | Grady et al. .................. 16/444 |
| 6,592,240 | B2 | 7/2003 | Camarota et al. |
| 6,634,065 | B2 * | 10/2003 | Chesson et al. ............... 24/289 |
| 6,854,870 | B2 * | 2/2005 | Huizenga .................... 362/501 |

(Continued)

OTHER PUBLICATIONS

Downloaded pages from www.lincoln.com, regarding 2006 Lincoln Mark LT—Safety & Security—Personal Safety System—Keyless Entry (2 pages) Jan. 18, 2006.

(Continued)

*Primary Examiner*—Anh V La
(74) *Attorney, Agent, or Firm*—McKee, Voorhees & Sease, P.L.C.

(57) ABSTRACT

A vehicle grab handle is provided to assist entry into the vehicle, such as an RV, semi tractors, emergency vehicles, utility vehicles, construction equipment and agriculture equipment and other vehicles. The handle includes a pair of spaced apart end bases and a grab bar extending between the bases. A keypad is provided in one of the bases to provide keyless entry into the vehicle or other controls of the vehicle. An LED is provided in the opposite end base so as to illuminate the grab bar. Multiple LEDs having different colors may be provided, with electrical circuitry connected to the door lock and to a vehicle alarm so that solid or blinking lights and different colored lights provide a visual display corresponding to the locked or unlocked status of the door, the activated or deactivated status of the alarm, or status of other vehicle accessories including diagnostics.

19 Claims, 5 Drawing Sheets

U.S. PATENT DOCUMENTS 7,096,698 B2 * 8/2006 Walsh et al. .................. 70/472
7,205,884 B2 * 4/2007 Kumazaki et al. .......... 340/5.61
2005/0006917 A1 1/2005 Sparks et al.

OTHER PUBLICATIONS

Downloaded pages from www.strombergcarlson.com, regarding Grab Handles (1 page) Sep. 13, 2005.
Downloaded pages from www.litecousa.com regarding Liteco—La Curve (1 page) Sep. 13, 2005.
Downloaded pages from www.litecousa.com regarding Liteco—Lumagrip (1 page) Sep. 13, 2005.
Downloaded pages from www.litecousa.com regarding Liteco—Centaurus Lighted Grab Bar (1 page) Sep. 13, 2005.
Downloaded pages from www.itc-marine.com regarding ITC Incorporated Assist Handles (2 pages) Sep. 13, 2005.

* cited by examiner

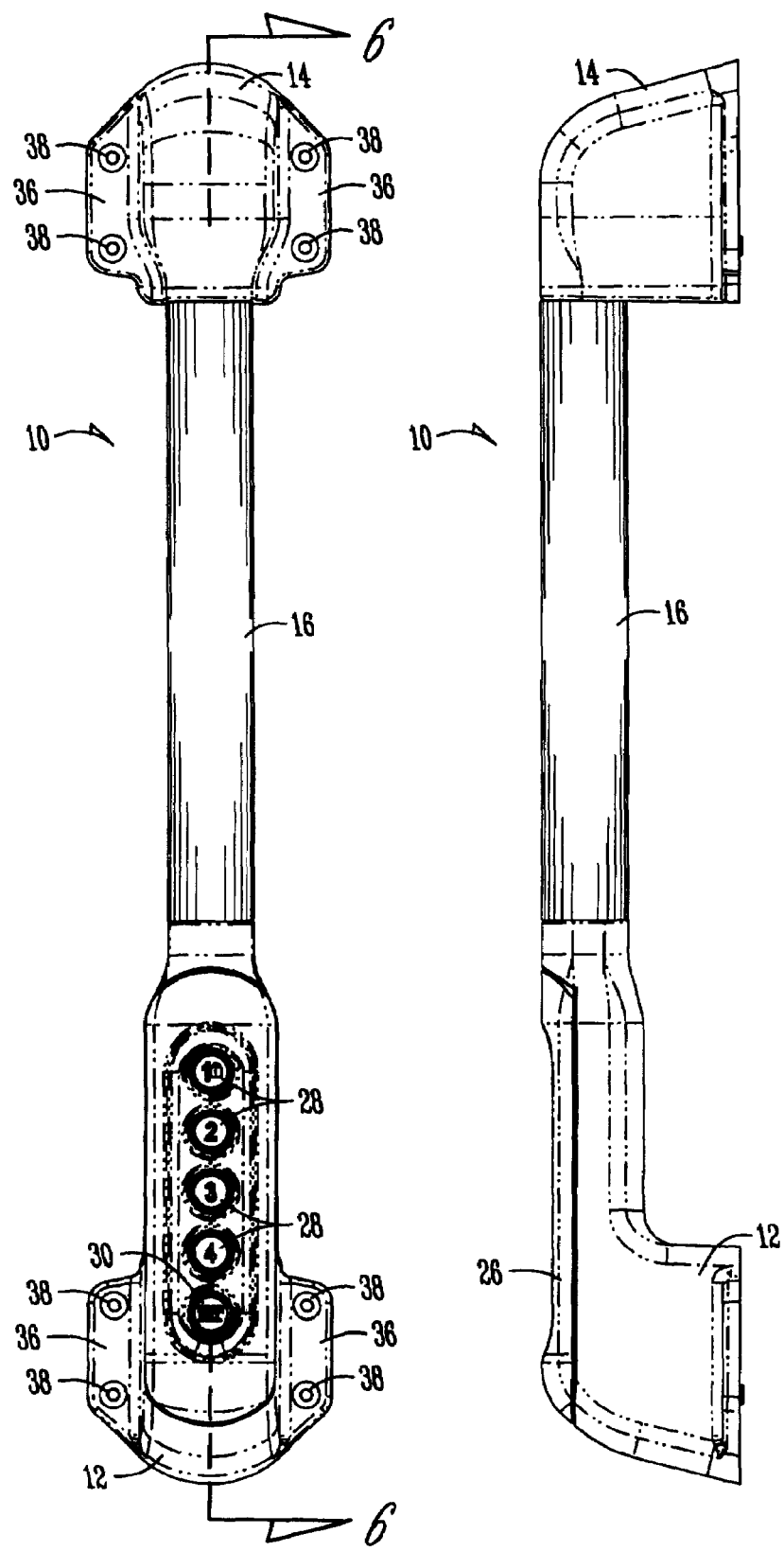

ICE GRAB HANDLE WITH KEYPAD FOR KEYLESS ENTRY

BACKGROUND OF THE INVENTION

Grab handles or bars are commonly used on vehicles which require a person to step up into the cab or coach, such as in recreational vehicles (RVs), tractors for semi-trailer trucks, emergency vehicles, and utility vehicles. Typically, such grab bars are mounted to the side of the vehicle adjacent the door to facilitate and assist a person climbing into the vehicle. Illuminated grab handles are also known, which use an LED or other light source to illuminate an acrylic or clear plastic portion of the grab bar at night. Such grab bars are relatively simple in construction, and serve a single function of allowing a person to see and grab the bar. Conventional grab bars have no communication with the door lock and/or alarm of a vehicle.

Accordingly, a primary objective of the present invention is the provision of an improved vehicle grab handle for use with RVs, semi tractors, emergency vehicles, utility vehicles, construction equipment and agriculture equipment and other vehicles.

A further objective of the present invention is the provision of an improved grab handle having a keypad for keyless entry into the vehicle.

Still another objective of the present invention is the provision of an improved grab handle providing different colors to indicate different status of door locks, vehicle alarm, or other settings of the vehicle including diagnostics for equipment troubleshooting.

A further objective of the present invention is the provision of an improved vehicle grab handle having electrical circuitry which changes LED flashing, either number of times, activation time or frequency to identify the status of the door locks, vehicle alarm, or other settings of the vehicle including equipment diagnostics.

Still another objective of the present invention is the provision of an improved vehicle grab handle which is illuminated and has a keypad for keyless entry.

Yet another objective of the present invention is the provision of an improved vehicle grab handle which is economical to manufacture, easy to install, and durable, safe, and effective in use.

These and other objectives will become apparent from the following description of the invention.

BRIEF SUMMARY OF THE INVENTION

An improved vehicle grab handle includes a pair of spaced apart end bases adapted to be mounted adjacent the door of an RV, semi-trailer tractor, utility vehicle, emergency vehicle, or similar vehicles. A grab bar extends between the end bases. A keypad is provided in one of the bases and is operatively connected to the vehicle for keyless entry or other operations of the vehicle. The grab handle also includes one or more LEDs in one of the bases to illuminate the grab bar. Electrical circuitry is provided for communication between the LEDs and the keyless-entry system, alarm system and as well as between other accessories on the vehicle. Different colored or flashing LEDs can be utilized to indicate the status of the door lock as locked or unlocked, status of the alarm as activated or deactivated, or status of other vehicle accessories including diagnostics. The keypad may also be used as an exterior control panel to control many vehicle functions including, but not limited to lights, horn, windows, other motors, hydraulics, solenoids, or a doorbell on an RV, semi-trailer tractor, utility vehicle, emergency vehicle, or similar vehicles.

BRIEF DESCRIPTION OF THE DRAWINGS

FIG. 2 is a top elevation view of the grab handle.

FIG. 3 is a side elevation view of the grab handle.

DETAILED DESCRIPTION OF THE PREFERRED EMBODIMENT

Figure 1:
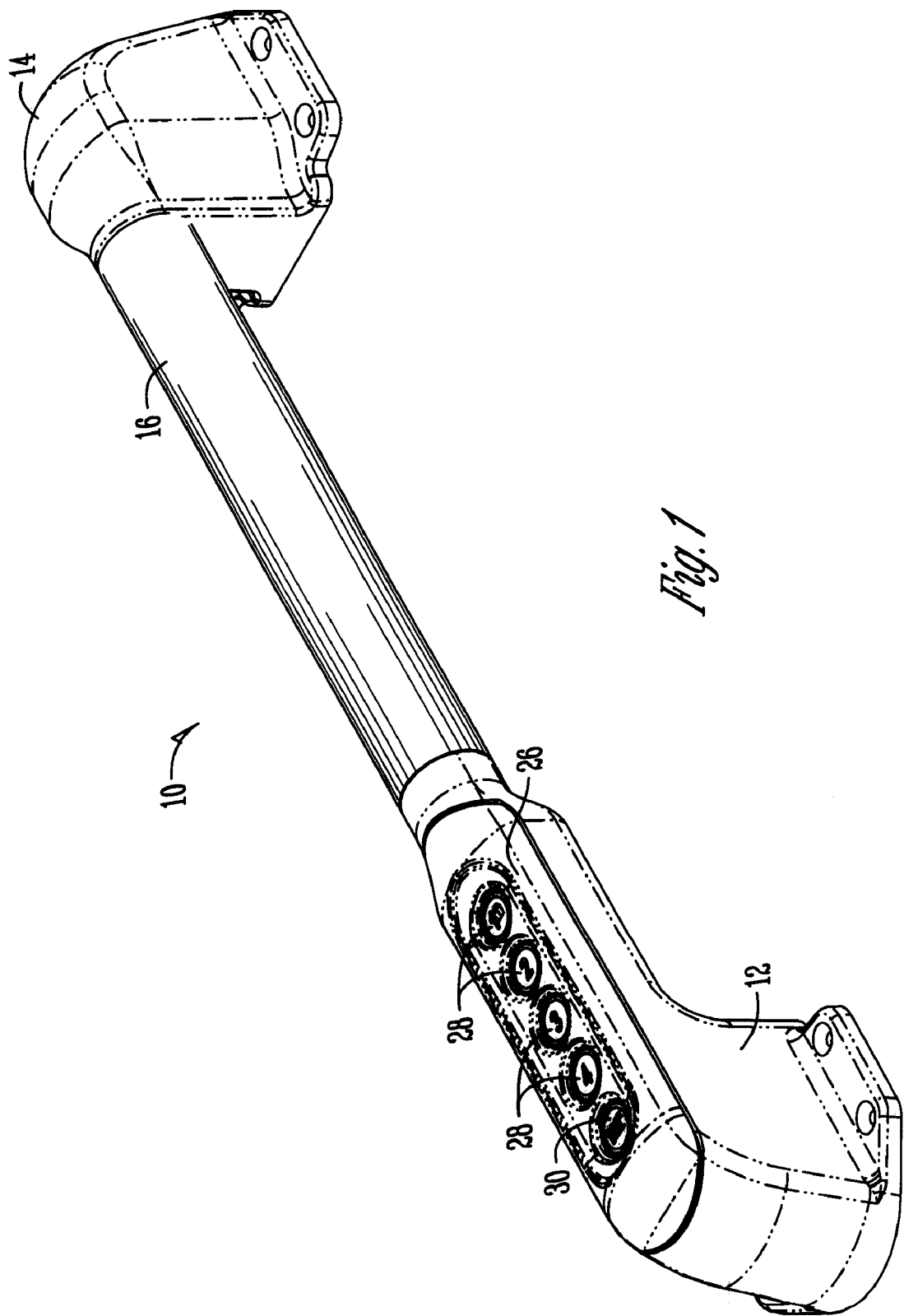
FIG. 1 is a perspective view of the improved vehicle grab handle of the present invention.

The improved vehicle grab handle of the present invention is designated in the drawings by the reference numeral 10. The grab handle 10 is intended for use on an RV, and on other vehicles such as a semi-trailer tractor or cab, an emergency vehicle, a utility vehicle, construction or agricultural equipment and similar vehicles which typically require at least one step up for a person to enter the vehicle.

Figure 6:
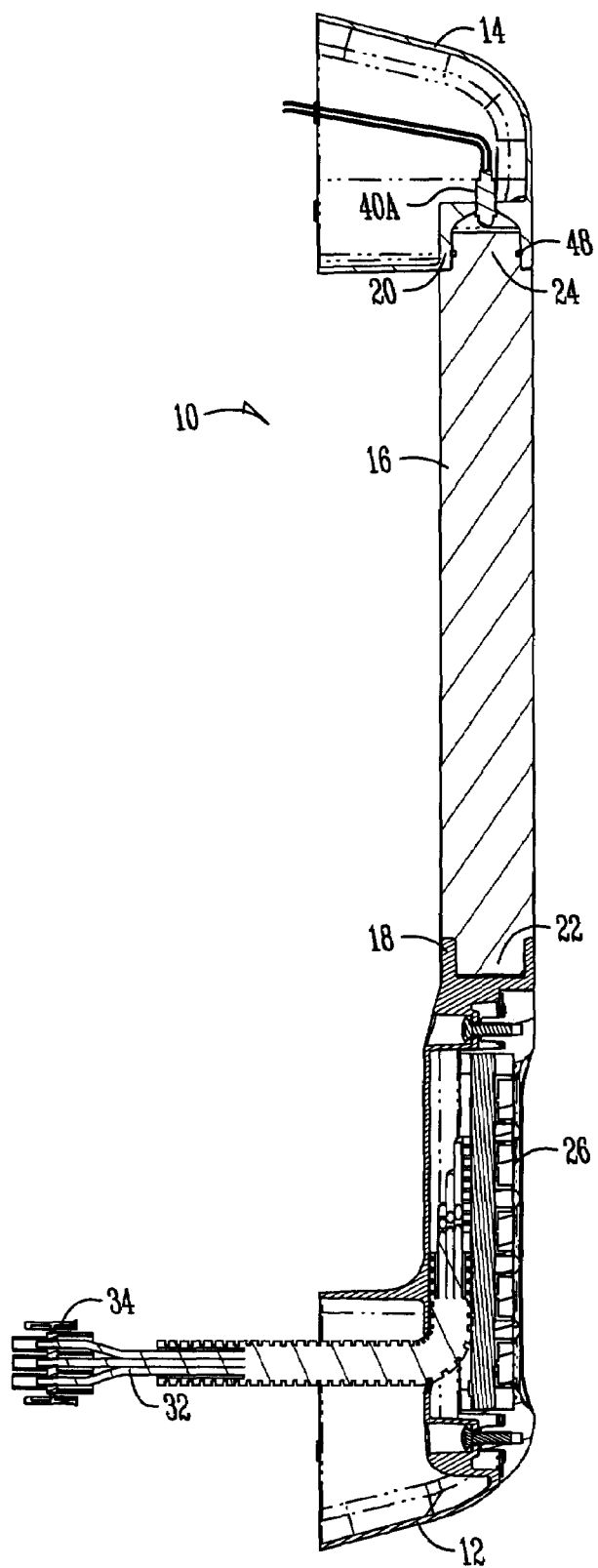
FIG. 6 is a sectional view taken along lines 6-6 of FIG. 2.
Figure 7:
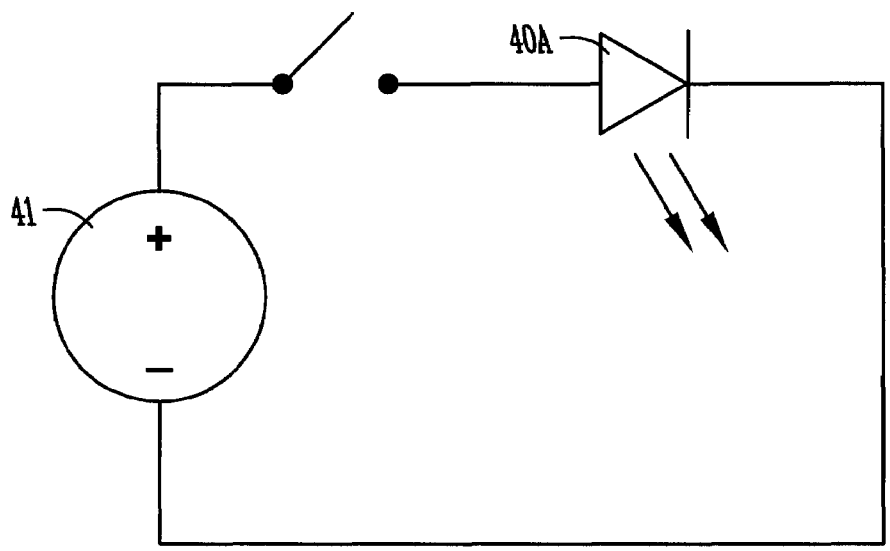
FIG. 7 is an electrical schematic for an illuminated grab handle without a keypad function.
Figure 8:
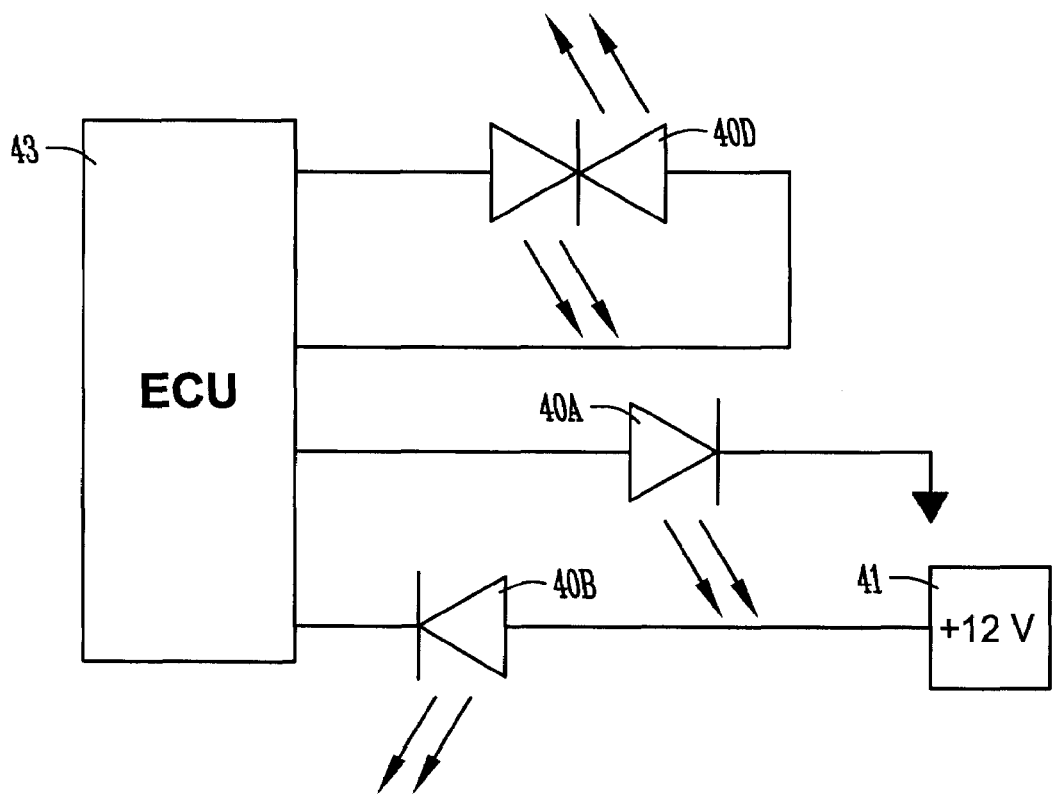
FIG. 8 is an electrical schematic for an illuminated grab handle integrated with a keypad function, such as shown in FIG. 1.

The grab handle 10 includes a first end base 12, a second end base 14 and a rod 16 extending between the bases 12, 14. The bar 16 may be either clear, frosted, textured, or may be made of different materials and have different surface classifications. The use of different materials and surfaces characteristics provides for different styling and grab feel for increased grip and safety As best seen in FIG. 6, each end base 12, 14 includes a socket 18, 20 respectively adapted to receive reduced diameter ends 22, 24 of the bar 16. While the bar 16 is preferably round in cross section, other cross sectional shapes may be utilized. Also, one of the sockets 18, 20 and the mating end 22, 24 of the bar 16 each have mating flat portions to prevent rotation of the bar 16 within the bases 12, 14.

The first end base 12 includes an elongated recess to receive a keypad 26. The keypad 26 includes a plurality of buttons 28 with indicia, such as numbers or letters, which can be programmed for a specific combination of the button indicia so as to provide keyless entry or other control of the vehicle. The vehicle control may include lights, windows, other motors, hydraulics, or solenoids. The keypad may also include a doorbell button 30 connected to a doorbell in an RV. The electrical wires 32 for the keypad 26 extend rearwardly out of the first end base 12, as best seen in FIG. 6, and include a plug 34 for electrical connection in the vehicle.

The end bases 12, 14 each include flanges 36 with holes 38 therein adapted to receive mounting screws (not shown) for installing the grab handle 10 on the exterior of the vehicle adjacent the door.

Figure 4:
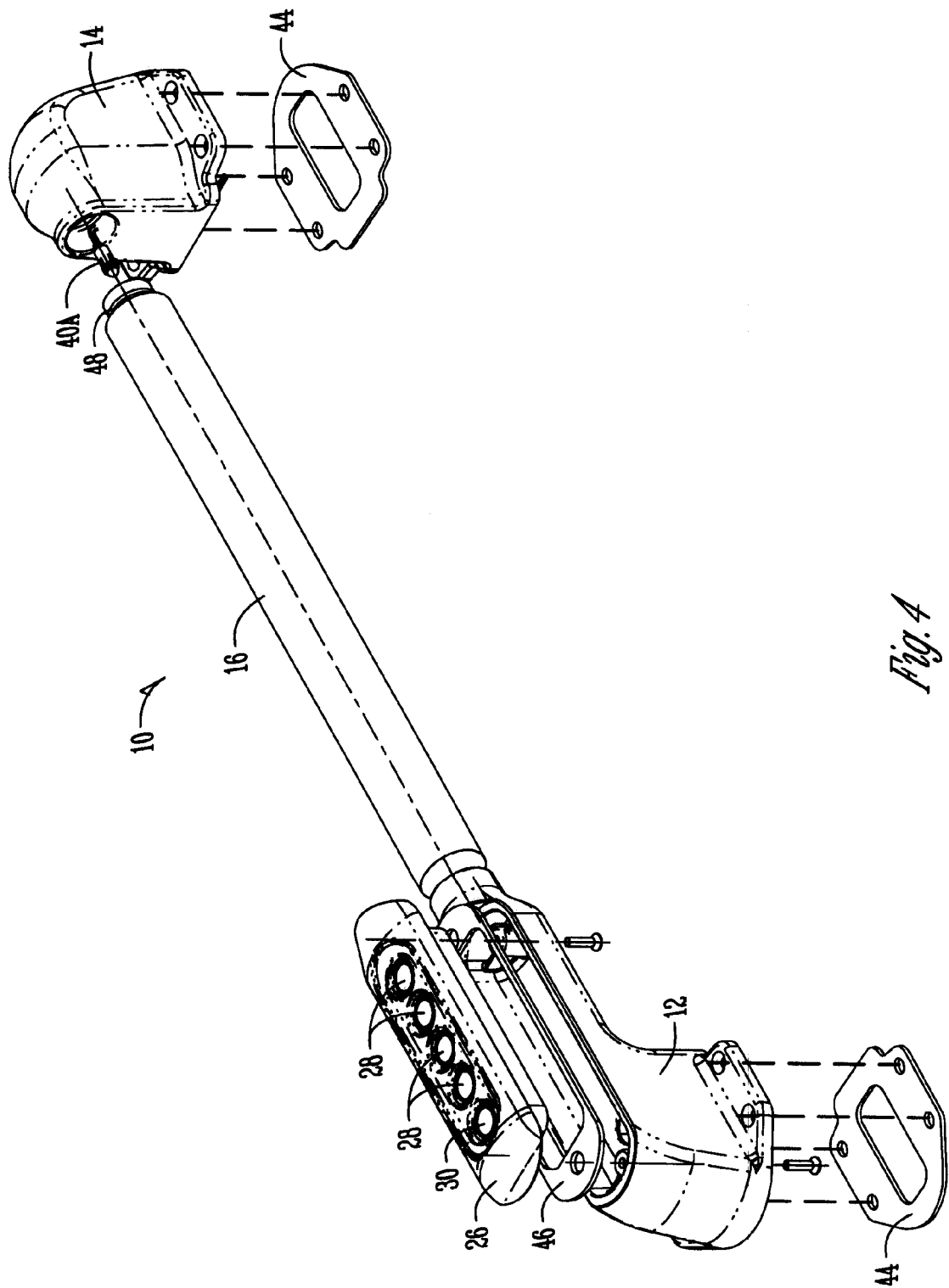
FIG. 4 is an exploded perspective view of the handle.
Figure 5:
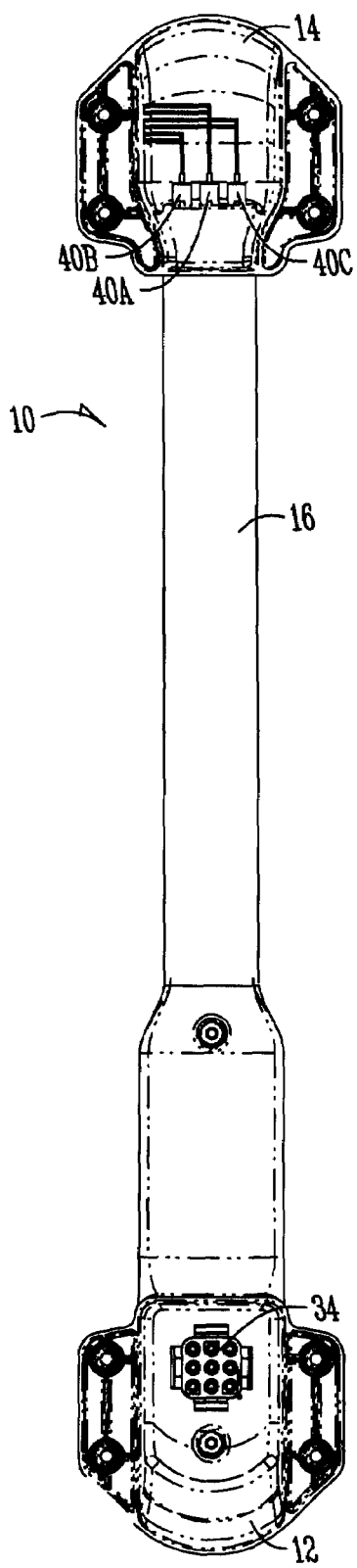
FIG. 5 is a bottom plan view of the handle.

As shown in FIG. 4, at least one LED 40A is provided in the second end base 14 and is electrically connected to a power source 41 or electrical control unit (ECU) 43 in the vehicle so as to illuminate the grab bar 16. As seen in FIG. 5, multiple LEDs 40A, B, C may be used, with each LED being a different color. Bidirectional LEDs 40D may be used to provide for additional colors. An electrical circuit 42 provides communication between the LEDs 40 A, B, C and the keyless-entry system of the vehicle. Thus, if the doors are locked, one color LED 40B is on, and if the doors are unlocked, a different color LED 40C is on, so as to provide a visual display corresponding to the status of the door locks. Alternatively, the same LED can be continuously on or blinking, as controlled by the circuit 42, to indicate the status locked and unlocked status of the door locks. The electrical circuitry 42 may also provide communication between the LEDs and a security alarm for the vehicle. If the alarm is deactivated, one of the LEDs 40A, 40B, or 40C is continuously on. If the alarm is activated, the LED can be pulsed so as to provide a blinking light through the bar 16. Thus, the LEDs may also provide a visual display of the status of the vehicle, including alarm state and other indicators and diagnosis.

A gasket 44 is preferably provided between each end base 12, 14 and the vehicle. Another gasket 46 between the first end base 12 and the keypad 26 is shown in FIG. 4. Also, the reduced diameter end of the bar 16 which is received in the socket 24 includes an annular groove with an O-ring 48 so as to provide a seal with the socket 24. Furthermore the printed circuit board in the keypad is potted with epoxy, silicone, or other suitable material. The gaskets 44 and 46, and the O-ring 48 protect the internal electrical components within the grab handle 10 from moisture and also keep water from entering the vehicle. Because the grab handle 10 is sealed against water entry, corrosion is reduced and reliability is increased.

It is understood that modifications can be made to the grab handle 10 without departing from the scope of the present invention. While LEDs are preferred for the light source for illuminating the bar 16, since LEDs use minimal current draw which is important in a battery based system, other light sources may also be utilized. Also, the keypad 26 and the LEDs 40 may be housed in opposite bases 12, 14, such that one or the other can be serviced without increasing the risk of water intrusion into the other area. The bases 12, 14 may be made of zinc, aluminum, plastic or other material based on load carrying requirements. The bar 16 may also be etched, textured, painted, or otherwise provided with a logo or name. The keypad 26 may be multi-plexed, discrete, or wireless. Software for the keypad 26 may be customized for particular applications so as to provide any number of outputs and combinations of outputs, secured, so as to require an access code, or non-secured such as for a doorbell. Graphics on the keypad 26 are also customizable to each application.

The illumination and keyless entry of the grab handle 10 is controlled by electrical circuitry. The circuitry may take numerous forms, such as described in Applicant's U.S. Pat. No. 7,034,655 B2 Keypad Module and Method for Electronic Access Security and Keyless Entry of a Vehicle and co-pending application, publication number US 2005/0140496 A1, Keypad and Method for Electronic Access Security and Keyless Entry of a Vehicle which discloses circuitry for a keyless entry keypad The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A grab handle assembly to assist entry into a vehicle, the vehicle having a door with a lock, the grab handle assembly comprising:
    a pair of separate, spaced apart end bases adapted to be mounted to the vehicle adjacent and apart from the door so as to be stationary;
    a grab bar extending between the end bases for grabbing by a person; and
    a keypad in one of the end bases operatively connected to the door lock of the vehicle for keyless entry into the vehicle.

2. The assembly of claim 1 further comprising a first LED in one of the end bases to illuminate the grab bar.

3. The assembly of claim 2 wherein the keypad and the LED are in opposite end bases.

4. The assembly of claim 2 further comprising a second LED in one of the end bases to illuminate the grab bar, and the first and second LEDs having different colors.

5. The assembly of claim 1 further comprising multiple LEDs in one of the end bases to provide multiple color illumination of the grab bar, with each color designating a different operative status of the door lock.

6. The assembly of claim 5 further comprising electrical circuitry for providing communication between the LEDs and the door lock.

7. The assembly of claim 6 wherein the circuitry provides communication between at least one of the LEDs and an alarm on the RV whereby the LED changes between continuous illumination and blinking illumination to indicate activated and deactivated status of the alarm.

8. The assembly of claim 1 wherein the keypad includes a doorbell button operatively connected to a doorbell of the vehicle.

9. The grab handle assembly of claim 2 wherein the grab bar is elongated and is illuminated substantially along its length in all dimensions.

10. The grab handle assembly of claim 1 wherein the grab bar has opposite ends and a middle grip portion, and the grab handle being free of structure between the grip portion and the vehicle.

11. A vehicle grab handle to assist entry into the vehicle, the vehicle having a door with a lock, the grab handle comprising:
    a pair of separate, spaced apart end bases adapted to be mounted to the vehicle adjacent and apart from the door so as to be stationary;
    a grab bar extending between the end bases for grabbing by a person;
    first and second LED in one of the end bases to illuminate the grab bar, and the first and second LEDs having different colors; and a keypad in one of the end bases operatively connected to the door lock for keyless entry into the vehicle.

12. The vehicle grab handle of claim 11 wherein a first LED color indicates that the door is locked and a second LED color indicates that the door is unlocked.

13. The vehicle grab handle of claim 11 further comprising electrical circuitry providing communication between the LEDs and the lock.

14. The vehicle grab handle of claim 11 wherein the vehicle includes an alarm, and further comprises electrical circuitry providing communication between the LEDs and the alarm.

15. The vehicle grab handle of claim 14 wherein one of the LEDs changes between continuous illumination and blinking illumination to indicate activated and deactivated status of the alarm.

16. The vehicle grab handle of claim 11 wherein the keypad includes a doorbell button operatively connected to a doorbell of the vehicle.

17. The grab handle of claim 11 wherein the keypad and the LED are in opposite end bases.

18. The grab handle assembly of claim 11 wherein the grab bar is translucent.

19. The grab handle of claim 11 wherein the grab bar has opposite ends and a middle grip portion, with the bases being at the opposite ends of the grab bar, and with no structure of the bases extending between the grip portion and the vehicle.

* * * * *